United States Patent
Zhu

(10) Patent No.: US 10,981,097 B2
(45) Date of Patent: Apr. 20, 2021

(54) HIGH-TEMPERATURE DUST REMOVAL AND FILTERING APPARATUS, HIGH-TEMPERATURE DUST REMOVAL AND FILTERING SYSTEM, AND CONTINUOUS DUST REMOVAL AND FILTERING METHOD

(71) Applicant: Henan Dragon Into Coal Technology Co., Ltd., Henan (CN)

(72) Inventor: Shucheng Zhu, Nanyang (CN)

(73) Assignee: Henan Dragon Into Coal Technology Co., Ltd., Henan (CN)

( * ) Notice: Subject to any disclaimer, the term of this patent is extended or adjusted under 35 U.S.C. 154(b) by 219 days.

(21) Appl. No.: 16/198,521

(22) Filed: Nov. 21, 2018

(65) Prior Publication Data
US 2019/0168152 A1 Jun. 6, 2019

Related U.S. Application Data

(63) Continuation-in-part of application No. PCT/CN2017/089669, filed on Jun. 23, 2017.

(30) Foreign Application Priority Data

May 24, 2016 (CN) .......................... 201610345421.7

(51) Int. Cl.
*B01D 46/00* (2006.01)
*C10K 1/02* (2006.01)
(Continued)

(52) U.S. Cl.
CPC ....... *B01D 46/0068* (2013.01); *B01D 46/002* (2013.01); *B01D 46/4263* (2013.01);
(Continued)

(58) Field of Classification Search
CPC .. B01D 46/00; B01D 46/002; B01D 46/0068; B01D 46/4263; B01D 46/4444;
(Continued)

(56) References Cited

U.S. PATENT DOCUMENTS 4,108,617 A * 8/1978 Frantz ................... B01D 46/46
   55/DIG. 17
4,364,749 A * 12/1982 Dunseith .............. B01D 46/002
   55/287

(Continued)

FOREIGN PATENT DOCUMENTS

CN    1544120    11/2004
CN    202105534   1/2012
(Continued)

OTHER PUBLICATIONS

CN 103265978A_ENG (Espacenet machine translation of Chen) (Year: 2013).*
(Continued)

*Primary Examiner* — Jonathan Miller
*Assistant Examiner* — Gabriel E Gitman
(74) *Attorney, Agent, or Firm* — Leydig, Voit & Mayer, Ltd.

(57) ABSTRACT

A high-temperature dust removal and filtering apparatus, comprising a set of high-temperature dust removal and filtering devices and a pre-heating apparatus and regeneration apparatus provided for the high-temperature dust removal and filtering devices; a high-temperature dust removal and filtering system, comprising two or more sets of high-temperature dust removal and filtering devices, and a pre-heating apparatus and regeneration apparatus provided for the high-temperature dust removal and filtering devices; a continuous dust removal and filtering method consisting of two or more sets of high-temperature dust removal and (Continued)

filtering devices and a pre-heating apparatus and regeneration apparatus provided for the high-temperature dust removal and filtering devices. Said method is implemented with a high-temperature dust removal and filtering system capable of switching. The high-temperature dust removal and filtering system always keeps one or more sets of high-temperature dust removal and filtering devices in a normal filtering state.

18 Claims, 8 Drawing Sheets

(51) Int. Cl.
    B01D 51/10      (2006.01)
    C10G 31/09      (2006.01)
    C10G 1/02       (2006.01)
    C10B 53/02      (2006.01)
    C10B 53/06      (2006.01)
    B01D 46/42      (2006.01)
    B01D 46/44      (2006.01)
    C10B 27/06      (2006.01)
    C10G 1/00       (2006.01)

(52) U.S. Cl.
    CPC ......... *B01D 46/444* (2013.01); *B01D 46/446* (2013.01); *B01D 46/448* (2013.01); *B01D 51/10* (2013.01); *C10B 27/06* (2013.01); *C10B 53/02* (2013.01); *C10B 53/06* (2013.01); *C10G 1/002* (2013.01); *C10G 1/02* (2013.01); *C10G 31/09* (2013.01); *C10K 1/024* (2013.01); *B01D 2273/20* (2013.01); *B01D 2279/00* (2013.01); *Y02E 50/10* (2013.01)

(58) Field of Classification Search
    CPC .... B01D 46/446; B01D 46/448; B01D 51/10; B01D 2273/20; B01D 2279/00; C10G 1/00; C10G 1/002; C10G 1/02; C10G 31/09; C10B 27/06; C10B 53/02; C10B 53/04; C10B 53/06; C10K 1/02; C10K 1/024; Y02E 50/14
    See application file for complete search history.

(56) References Cited

U.S. PATENT DOCUMENTS

| | | | | |
|---|---|---|---|---|
| 2004/0112218 | A1* | 6/2004 | Steiner | F01N 3/031 95/278 |
| 2008/0127824 | A1 | 6/2008 | Takase et al. | |
| 2012/0017499 | A1* | 1/2012 | Leonhardt | C10L 9/083 44/606 |
| 2013/0276628 | A1* | 10/2013 | Chalabi | B01D 46/0068 95/9 |
| 2016/0001210 | A1* | 1/2016 | Isaksson | B01D 46/0058 95/279 |

FOREIGN PATENT DOCUMENTS

| | | | | |
|---|---|---|---|---|
| CN | 202105534 | U * | 1/2012 | ............ B01D 46/24 |
| CN | 202516693 | | 11/2012 | |
| CN | 202516693 | U * | 11/2012 | ............... B03C 3/34 |
| CN | CN202516693 | * | 11/2012 | ............... B03C 3/34 |
| CN | 103265978 | | 8/2013 | |
| CN | 103265978 | A * | 8/2013 | ........... Y02P 20/584 |
| CN | 103961954 | | 8/2014 | |
| CN | 104083963 | | 10/2014 | |
| CN | 104083963 | A * | 10/2014 | ............ B01D 46/00 |
| CN | 104774653 | | 7/2015 | |
| CN | 105779024 | | 7/2016 | |
| CN | 105885957 | | 8/2016 | |
| EP | 0026854 | | 4/1981 | |
| JP | H07289833 | | 11/1995 | |
| RU | 2440174 | | 1/2012 | |

OTHER PUBLICATIONS

Cn 104083963A_ENG (Espacenet machine translation of Zhu) (Year: 2014).*
CN202105534U_ENG (Espacenet machine translation of Yang) (Year: 2012).*
CN202516693U_ENG (Espacenet machine translation of Fu) (Year: 2012).*
Search Report and Written Opinion, dated Sep. 26, 2017, corresponding to International Application No. PCT/CN2017/089669 (filed Jun. 23, 2017), parent of the present application, 13 pp.
Chinese Search Report, dated Apr. 3, 2018, corresponding to Chinese Application No. 2016103454217 (filed May 24, 2016), parent of the present application, 1 p.
Chinese First Office Action, dated Apr. 3, 2018, in Chinese Patent Application No. 2016103454217, parent of the present application, 1 pp.
Chinese Second Office Action, dated Feb. 28, 2019, corresponding to Chinese Patent Application No. 201610345421.7, 10 pp.
Chinese Third Office Action, dated Aug. 30, 2019, corresponding to Chinese Patent Application No. 201610345421.7, 8 pp.
Chinese Patent Office, "Notification to Grant Patent Right for Invention," dated Mar. 4, 2020, corresponding to Chinese Patent Application No. 201610345421.7, 3 pp.
Kazakhstan Patent Office, "Notification to Grant Patent Right," dated Jan. 16, 2020, corresponding to Kazakhstan Patent Application No. 2018/0929.1, 13 pp.
Russian Office Action, dated Jun. 7, 2019, corresponding to Russian Patent Application No. 2018141342/05(068919), 6 pp.
Russian Patent Office, "Notification to Grant Patent Right," dated Sep. 13, 2019, corresponding to Russian Patent Application No. 2018141342/05(068919), 37 pp.
Russian Search Report, dated Jun. 7, 2019, corresponding to Russian Patent Application No. 2018141342/05(068919), 2 pp.
Ukraine Office Action, dated Jun. 3, 2020, corresponding to Ukrainian Patent Application No. a201812386, 4 pp.
Ukraine Patent Office, "Notification to Grant Patent Right," dated Aug. 19, 2020, corresponding to Ukrainian Patent Application No. a201812386, 8 pp.

* cited by examiner

HIGH-TEMPERATURE DUST REMOVAL AND FILTERING APPARATUS, HIGH-TEMPERATURE DUST REMOVAL AND FILTERING SYSTEM, AND CONTINUOUS DUST REMOVAL AND FILTERING METHOD

CROSS-REFERENCE TO RELATED APPLICATIONS

The present application is a continuation-in-part of international patent application no. PCT/CN2017/089669, filed on Jun. 23, 2017 and entitled "High-Temperature Dust Removal and Filtering Apparatus, High-Temperature Dust Removal and Filtering System, and Continuous Dust Removal and Filtering Method", which claims priority to Chinese patent application no. 201610345421.7, filed with the Chinese Patent Office on May 24, 2016, and entitled "High-Temperature Dust Removal and Filtering Apparatus, High-Temperature Dust Removal and Filtering System, and Continuous Dust Removal and Filtering Method", which are incorporated herein by reference in their entirety.

TECHNICAL FIELD

The present disclosure relates to the field of oil gas filtering and dust removal during coal carbonization pyrolysis, coal-to-liquids, oil shale pyrolysis and biomass pyrolysis at a high temperature of 200~1200° C., especially the field of coal pyrolysis where coal pyrolysis happens at a typical high temperature of 300~750° C. and the field of biomass pyrolysis where biomass pyrolysis happens at a typical high temperature of 250~500° C., and relates to a high-temperature dust removal and filtering apparatus, a high-temperature dust removal and filtering system, and a dust removal and filtering method for coal gas.

BACKGROUND OF THE INVENTION

In the field of coal pyrolysis, there are high-temperature pyrolysis and medium-low-temperature pyrolysis. The main process for high-temperature pyrolysis is coking, and the main process for medium-low-temperature pyrolysis is production of semi-coke. In the aforementioned two processes, there is little dust as the furnace burden is relatively static in the coke furnace and the semi-coke is in blocks. Hence, dust removal for coal gas is not really a problem. But such two processes also have a relatively low tar yield. In the case where crushed coal accounts for more than 70%, the biggest problems with the pyrolysis process which extracts tar from coal as much as possible are high dust content (about 1000 g dust content in every 1 Nm3 coal gas produced) and high tar content (about 2000 g tar content in every 1 Nm3 coal gas produced) in coal gas. Ordinary bag filters are not available for filtering such coal gas at such temperature. A fly ash filter becomes an option. Coal-to-gas and coal-to-liquids with a relatively low dust content can make do with such filter even with its short operation cycle and high maintenance cost, but such filter is not insufficient or perfect for coal gas with both high dust content and tar content. Without an overall preheating means and regenerating means for the filter, the filtering operation of the filter would be very time limited and hard, and the regeneration of filter element of the filter would be even harder. Without two or more sets of switchable filters, it is impossible for the filtering device to keep running for a long term, even with back flushing (which is to flush off the dust adhering to the outer surface of the filter element when the filter element is filtering, so as to prevent the dust from forming a thick filter cake too quickly on the surface of the filter element, reduce the filtering resistance and prolong the service cycle of the filtration, but it does not equate to regeneration). Within one day, the filter may fail to go on within less than 5 hours due to loss of filtering capacity as a thick filter cake containing tar and dust covers the surface of the filter element, which forces the pyrolysis apparatus to stop. It is suggested that ultrasonic wave be used for cleaning. However, cleaning with ultrasonic wave only deals with several or tens of filter elements, which is not efficient and costly. Besides, there is a high probability that the filter elements might be damaged during dismounting and handling. Therefore, such method on its own might bankrupt an enterprise. Until one day, we opened the filter and it ignited on its own with a fast temperature rise. The filter element was partially burned, but this gave us some inspiration.

Medium-low-temperature coal tar, the raw material, has a high carbon/hydrogen ratio and a high unsaturated olefins and aromatic hydrocarbons content. Because of such property of the medium-low-temperature coal tar, such coal gas is likely to change physically or chemically when confronting a medium with a temperature lower or higher than its pyrolysis temperature. Specifically, in the case of a low-temperature medium, the tar gas would precipitate from the coal gas, namely, there would be liquid coal tar on the medium, whereas in the case of a high-temperature medium, the coal tar in the coal gas would undergo problems of deep pyrolytic cracking where macromolecules become micromolecules, and coking where tar molecules are carbonized as a result of hydrogen loss, condensation of unsaturated olefins and lengthened hydrocarbon chains. Then when coal gas enters the medium of a filter, if the filter is cold, tar will be condensed on the filter and is likely to bond with dust and thus quickly block the filter element, and if it is locally hot within the filter, the tar gas will undergo deep pyrolytic cracking where gas substances become solid coked substances which will deposit in the micropores of the filter element and the micropores of the filter cake bonded and formed on the surface of the filter element and thus block the micropores, and as a result, the difference in the gas pressures before and after the filter element increases rapidly and therefore the filtering capacity decreases rapidly. Unsaturated olefin condensation results in larger tar molecules and makes it possible for gas tar to become liquid tar which is likely to bond with dust and thus quickly thicken the filter cake, and liquid tar tends to block the microvoids of the filter element and the filter cake, quickly and significantly decreasing the filtering capacity.

Some of prior art provides a preheating mechanism for the filter, but such preheating mechanism simply heats laboratory or small filters and is not meant for large volume filters required for filtering coal gas with a large gas amount, a high dust content and a high tar content, not to mention that a large volume filter (e.g. equal to or more than 100 m$^3$) needs a certain preheating temperature inside and how important and significant a consistent overall temperature inside the filter is for filtering. Without preheating the filter, the filter elements in the filter will be quickly blocked as a result of the bonding of the precipitated tar and the dust. Similarly, without preheating the overall large cavity of the filter, the filter elements will also be blocked by coke powder deposits which are formed as the tar gas in the coal gas are pyrolyzed and coked due to local high or low temperatures and which will block the micropores in the filter elements and the filter cake, or it might be the case that macromolecular liquefied tar formed by condensation and the precipitated tar bond with dust, thus forming a fast growing and thickened filter cake, and liquefied tar will quickly block the micropores in the filter cake and the filter elements. Either way, the filtering capacity of the filter will decrease rapidly, and frequent damage to the components inside the filter is also inevitable. Therefore, the filter work of the device will be hard.

Without a preheating means to preheat the filter, when coal gas with a high dust content and a high tar content comes to a low-temperature filter, the tar gas will precipitate from the coal gas and transforms from gas state to liquid state, and both the tar and the dust will stay on the surface of the filter elements. As the dust is bonded with the tar, it would be very difficult to strip the dust from the filter elements. Even with back flushing, it is still hard to strip such dust from the filter elements as it is different from ordinary dust. During filtration, ordinary dust first creates a dust layer on the surface of the filter element, and then little by little, the dust layer thickens and densifies to form a relatively hard coat which contributes to filtration and therefore is called filter cake. A filter cake is formed little by little but obstructs filtration as the resistance increases. In the case of back flushing, for ordinary dust, the dust on the filter cake formed on the filter element is very likely to be blown off once back flushing is performed. In the case of tar and dust which are adsorbed on the filter element together like binders, they adhere on the surface of the filter element, like an adhesive. Back flushing barely works on them, so the filter cake formed by them grows at a surprising speed. Soon the tar and dust in the coal gas will create a thick and solid filter cake on the outer surface of the filter element. The presence of tar will quickly block the micropores in the filter cake and the filter element. Before long, the filter is forced to stop. If the filter is preheated, but just in the aforementioned way which is basically radiation heating, only local heating can be achieved, because radiation heating is dependent to heating distance, wherein the temperature difference between 0.1 m distance and 2 m distance from the radiating heat source may reach 300° C. or more. Different temperatures at various parts in a large volume filter will lead to local tar precipitation, pyrolysis and coking, or tar condensation in the filter, and local filter element blockage within a short time, no matter whether local temperatures in the filter are low or high. Even with a regeneration means, the regeneration might not catch up with the blockage and thus continuous filtration is still not possible. Different local temperatures are also likely to create dust shed phenomenon between filter elements. Different temperatures result in different thicknesses of filter cakes on the filter elements and different back flushing effects. The sheds created might be minor or massive. They may be filtered by some filter elements, but for some other filter elements of which the filtering capacity has decreased, they might be overwhelming. Different dust sheds between the filter elements, in turn, result in different expansion forces of dust on the filter elements. This might break some filter elements, directly affecting the service life of the filter.

In the case where there is only preheating means, but no regeneration means, it will be hard to regenerate the filter within a short time and in an economical manner because of blockage, and thus it is difficult for the filter to work. Even if there is provided a regeneration means but with a small air amount, there might be only part of the regeneration air passing through the filter elements. That is, some filter elements are regenerated, but some are not, just like a short circuit, or the case may be that the regenerations are different, so the time for regeneration has to be prolonged. And different regenerations result in different degrees of dust shed ablation and falling off between the filter elements, and different transverse forces exerted by the dust sheds between the filter elements, which will also break some of the filter elements, directly affecting the service life of the filter, let alone continuous operation. Continuous filtering will still not be possible even with preheating and regeneration means if there are no switchable filters.

SUMMARY OF THE INVENTION

A high-temperature dust removal and filtering apparatus includes a high-temperature dust removal filter in which a filtering mechanism is provided and divides the internal space of the high-temperature dust removal filter into a coal gas inlet side and outlet side separated from each other. An inlet pipe for unfiltered coal gas is provided on the high-temperature dust removal filter. A coal gas inlet valve is provided on the coal gas inlet pipe. The coal gas inlet pipe is communicated with the inlet side of the high-temperature dust removal filter. An outlet pipe for filtered coal gas is provided on the high-temperature dust removal filter. A coal gas outlet valve is provided on the coal gas outlet pipe. The coal gas outlet pipe is communicated with the outlet side of the high-temperature dust removal filter. A back flushing system for filtration is provided at the outlet side of the high-temperature dust removal filter. The high-temperature dust removal and filtering apparatus includes a high-temperature dust removal filter and a preheating means and a regeneration means provided to overall preheat and regenerate the high-temperature dust removal filter.

BRIEF DESCRIPTION OF DRAWINGS

In order to more clearly illustrate the embodiments of the present disclosure or the technical solutions in the prior art, the drawings to be used in the embodiments or the description of the prior art will be briefly described below. Obviously, the drawings in the following description are only some embodiments of the present disclosure, and other drawings can be obtained from these drawings by those skilled in the art without any inventive effort.

Figure 1:
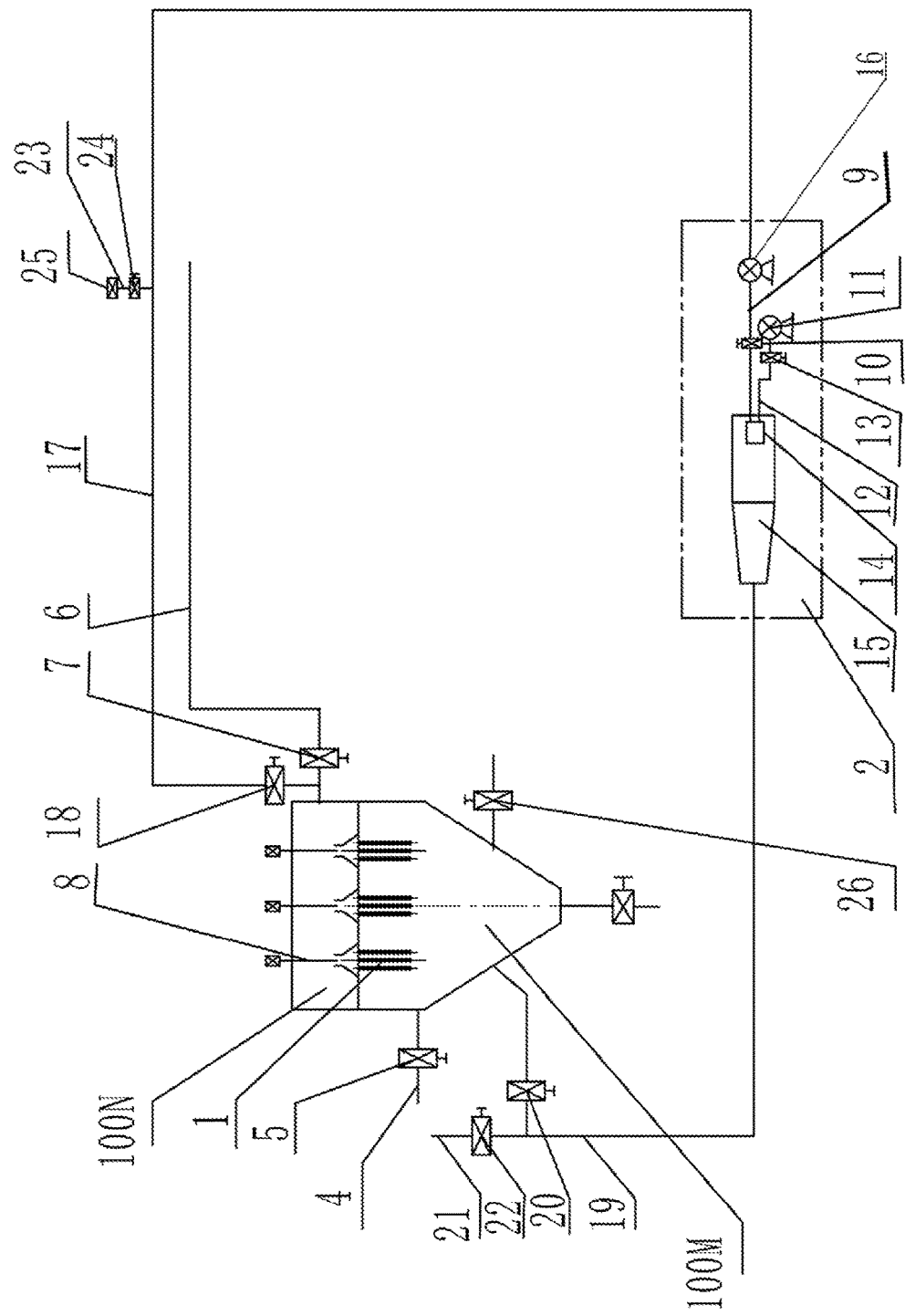
FIG. 1 is an structural schematic diagram of a set of high-temperature dust removal filter with a set of preheating means according to embodiments of the present disclosure.

Reference numerals: 1-filtering mechanism; 2-preheating means; 3-regeneration means; 4-coal gas inlet pipe; 5-coal gas inlet valve; 6-coal gas outlet pipe; 7-coal gas outlet valve; 8-back flushing system; 9-fuel pipe; 10-valve; 11-blower; 12-gas pipe; 13-valve; 14-burner nozzle; 15-combustion chamber/gas gathering chamber; 16-circulation fan; 17-circulation pipe; 18-valve; 19-hot gas outlet pipe for combustion chamber/gas gathering pipe; 20-valve; 21-preheating bleed pipe; 22-bleed valve; 23-exhaust gas bleed pipe; 24-bleed valve; 25-one-way valve; 26-coal gas replacement mechanism; 100N-outlet side; 100M-inlet side; 1A-high-temperature dust removal filter; 1B-high-temperature dust removal filter; 1C-high-temperature dust removal filter.

DETAILED DESCRIPTION OF THE INVENTION

The technical solutions in the embodiments of the present disclosure will be clearly and completely described in conjunction with the drawings in the embodiments of the present disclosure. The described embodiments are partial embodiments of the present disclosure, and not all of the embodiments. The components of the disclosed embodiments, which are generally described and illustrated in the figures herein, may be arranged and designed in various different configurations.

It should be noted that similar reference numerals and letters indicate similar items in the following figures, and therefore, once an item is defined in a drawing, it is not necessary to further define and explain it in the subsequent drawings.

In the description of the present disclosure, it should be further noted that unless otherwise specifically defined, the terms "set", "install", "connected", and "connecting" are to be understood broadly, and for example, may be fixed connection, detachable connection, or integral connection; may be mechanical connection or an electrical connection; may be directly connected or indirectly connected through an intermediate medium, or may be internal communication between the two elements. The specific meanings of the above terms in the present disclosure can be understood in the specific circumstances by those skilled in the art.

The purpose of preheating the high-temperature dust removal filter is to, when unfiltered coal gas arrives at the high-temperature dust removal filter, by heating the high-temperature dust removal filter in a cold condition, prevent from coal tar precipitation due to a low temperature or local low temperatures of the high-temperature dust removal filter, so that there will be no tar to bond with the coal dust and thus the filter elements are not quickly blocked, and to prevent tar gas from being coked in the micropores of the filter cake and the filter elements due to local overhigh temperature of the high-temperature dust removal filter, thus preventing deposition of solid coke particles and blockage of micropores. The purpose of regenerating the high-temperature dust removal filter is to, by providing oxygen-depleted gas (with an oxygen content of 0.5-10%), oxidize oxidizable granular coal powder and tar hydrocarbons deposited on the surface of the blocked filter elements, so that noncombustibles fall off to the bottom of the inlet side of the filter and thus gas permeability of filter elements is restored.

The preheating means for the high-temperature dust removal filter consists of a fuel pipe, a fuel valve, a blower, a gas duct, a gas valve, a burner nozzle, a combustion chamber, a circulation fan, a circulation gas pipe, a circulation gas valve, and a hot gas outlet pipe for the combustion chamber. The hot gas outlet pipe for the combustion chamber is communicated with the inlet side of the filter. The circulation fan is communicated with the circulation pipe and connected, through the circulation gas pipe, to the combustion chamber at one end and to the outlet side of the high-temperature dust removal filter at the other end. The preheating means is provided with circulation gas and circulation pipe to: first, utilize the large gas amount of circulation gas, as the circulation gas amount is generally equal to or more than 3 times of the gas amount produced by the normal combustion of the preheating means, so overall preheating of the high-temperature dust removal filter is particularly featured by large gas amount, contact type and zero dead angle; second, to reduce the temperature difference between the inlet side and the outlet side of the high-temperature dust removal filter using the large amount of circulation gas, to preheat various parts of the entire high-temperature dust removal filter more evenly using the heat discharged from the outlet side of the high-temperature dust removal filter, so that the various parts, including the filter elements at the various parts, of the high-temperature dust removal filter will be under a smaller thermal stress and thus the entire high-temperature dust removal filter will have a longer life; third, to improve the heat exchange capability for the entire high-temperature dust removal filter as the preheating means carries obviously more heat than other forms, so that it takes less time to preheat the high-temperature dust removal filter to a required balanced temperature.

A preheating bleed pipe is communicated with the hot gas outlet pipe for the combustion chamber of the preheating means for the high-temperature dust removal filter. A bleed valve is communicated with the preheating bleed pipe. The preheating bleed pipe and the bleed valve are provided to bleed off unburned gas mixture before the preheating means reaches stable combustion, and when the combustion is stable, to switch hot gas produced by the combustion into the high-temperature dust removal filter. This prevents unburned gas mixture from entering the high-temperature dust removal filter and thus guarantees the safety of the high-temperature dust removal filter.

The regeneration means for the high-temperature dust removal filter consists of a circulation pipe, a circulation fan, a blower, a gas gathering chamber and an a gas gathering pipe. The gas gathering pipe is connected to the inlet side of the high-temperature dust removal filter. A valve is provided on the gas gathering pipe. The circulation fan is communicated with the circulation pipe and is connected, through the circulation pipe, to the gas gathering chamber at one end and to the outlet side of the high-temperature dust removal filter at the other end. A valve is provided on the circulation pipe. By closing the valve at the coal gas outlet of the high-temperature dust removal filter and opening the valve on the circulation pipe, the gas from the outlet of the high-temperature dust removal filter is introduced into the circulation pipe of the regeneration system. The circulation gas amount and the blowing amount of the blower are adjusted respectively by adjusting the frequencies of the circulation fan and the blower (e.g. a typical total gas amount of 6000-10000 m3/h and oxygen content of 0.5~5% for a high-temperature dust removal filter with 300 m2 of filter elements). On one hand, the purpose and function of the circulation pipe of the regeneration means are similar to the circulation pipe for the preheating means, i.e. large gas amount, contact type, zero dead angle and uniform generation for the entire filter. On the other hand, the combination of large gas amount and low oxygen content makes it possible to control the oxidation rate of oxidizable particles deposited on the outer surface of the filter elements of the high-temperature dust removal filter and control the temperature during filter regeneration, and makes it possible to uniformly regenerate multiple sets of filter elements within the high-temperature dust removal filter. The blower is responsible for supplying oxygen, and the circulation fan is responsible for supplying large flow of oxygen-free or micro-oxygen circulation gas. As the oxygen content in the gas is kept within the safe range, the safety is guaranteed.

An exhaust gas bleed pipe and bleed valve are provided on the circulation pipes of the preheating means and regeneration means of the high-temperature dust removal filter. Preferably, a one-way valve is provided on top of the exhaust gas bleed pipes to only let the gas out but not in, so that excess exhaust gas is smoothly discharged from the bleed port.

More preferably, the preheating means and the regeneration means for the high-temperature dust removal filter are integrated into one and share one set of means. That is to say, the combustion chamber of the preheating means is also the gas gathering chamber of the regeneration means, the hot gas pipe of the preheating means is also the gas gathering pipe of the regeneration means, they share the circulation pipe, the circulation fan and the blower, an exhaust gas bleed pipe and bleed valve are provided on the circulation pipe and a one-way valve on top of the exhaust bleed pipe is shared. This is beneficial in the following aspects. In addition to the aforementioned advantage provided by the circulation pipe provided for the preheating means and the regeneration means, there are the following advantages. First, components are reduced, which saves investment and operation costs. Second, the structure is more compact, which saves space. A circulation fan and a circulation pipe are provided for the preheating means and the regeneration means of the high-temperature dust removal filter. The circulation gas comes from the outlet side of the high-temperature dust removal filter. The gas coming out from the outlet side is nearly oxygen-free gas in which oxygen is depleted after the combustibles are burned in the high-temperature dust removal filter. Then most of the circulation gas from the outlet side passes through the circulation pipe and the circulation fan, to the combustion chamber or the gas gathering chamber and then to the inlet side of the high-temperature dust removal filter after being mixed in the hot gas pipe or the gas gathering pipe. Such structure makes the preheating means and the regeneration means obviously economically competitive over other forms. The heating and regeneration of the entire internal cavity of the filter by a large gas amount is no way that any other preheating and regeneration forms can compete with. The heat transfer and regeneration are featured by direct contact type, large gas amount, zero dead angle, uniformity and controllability, large and quick heat transfer, and quick regeneration, so that the temperatures at the inlet side and the outlet side of the filter are close to each other during the entire preheating and regeneration. Normally, the overall temperature difference between the inlet side and the outlet side is no more than 20° C. The thermal stress inside the entire high-temperature dust removal filter is very small, and thus the filtering mechanism is not likely to be damaged, let alone local unbalanced temperatures. Besides, the coal gas will have a relatively stable property, and this greatly reduces phenomena of tar gas precipitation, coking and condensation within the high-temperature dust removal filter.

The preheating means keeps the inside temperature of the high-temperature dust removal filter close to a temperature at which the tar gas is not likely to undergo precipitation, pyrolysis and coking, or molecular condensation, and significantly increases single filtering cycle for the high-temperature dust removal filter. Therefore, simply the preheating means as described by the present disclosure is sufficient for a set of high-temperature dust removal filter to continuously work for over 5 days. The benefits brought thereby are considerable. It is possible for a set of high-temperature dust removal filter to operate in a relatively long cycle. The regeneration means makes it easy and quick to regenerate the filter. But what is more preferable is a system combining the obvious advantages of providing a preheating means and a regeneration means for the high-temperature dust removal filter with two or more sets of high-temperature dust removal filters. In such a system, the high-temperature dust removal filters are switchable between each other so that the high-temperature dust removal and filtering system has a longer (e.g. half a year, a year, several years) life for continuous filtration.

An inert gas replacement mechanism is provided at the inlet side of the high-temperature dust removal filter. Before the filter is regenerated, the coal gas within the high-temperature dust removal filter is replaced with superheated steam or inert gas. This guarantees safety of preheating and regeneration for the high-temperature dust removal filter.

The gas medium in the replacement mechanism is dry coal gas without dust or tar, superheated steam, nitrogen or carbon dioxide.

The back flushing gas in the back flushing system is dry coal gas without dust or tar, superheated steam, nitrogen or carbon dioxide.

The preheating and regeneration means for the high-temperature dust removal filter have a gas flowmeter provided on their respective gas ducts, combustible gas pipes and circulation gas pipes. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the preheating and regeneration of the filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

In some embodiments, as shown in FIG. 1:

The high-temperature dust removal and filtering apparatus includes a set of high-temperature dust removal filter (as shown in FIG. 1) and a preheating means provided for the high-temperature dust removal filter. A filtering mechanism 1 is provided in the high-temperature dust removal filter. The filtering mechanism 1 divides the internal space of the high-temperature dust removal filter into a coal gas inlet side 100M and an outlet side 100N separated from each other. An inlet pipe 4 for unfiltered coal gas is provided on the high-temperature dust removal filter. A coal gas inlet valve 5 is provided on the inlet pipe. The coal gas inlet pipe 4 is communicated with the inlet side 100M of the high-temperature dust removal filter. An outlet pipe 6 for filtered coal gas is provided on the high-temperature dust removal filter. A coal gas outlet valve 7 is provided on the outlet pipe. The coal gas outlet pipe 6 is communicated with the outlet side 100N of the high-temperature dust removal filter. A back flushing system 8 is provided for the high-temperature dust removal filter. The back flushing medium of the back flushing system is dry coal gas without dust or tar, superheated steam, nitrogen or carbon dioxide. A coal gas replacement mechanism 26 is provided at the inlet side of the filter. The replacement gas of the replacement mechanism is superheated steam, nitrogen or carbon dioxide.

The preheating means 2 for the high-temperature dust removal filter consists of a fuel pipe 9, a fuel valve 10, a blower 11, a gas duct 12, a gas valve 13, a burner nozzle 14, a combustion chamber 15, a circulation fan 16, a circulation gas pipe 17, a circulation and valve 18, a hot gas outlet pipe 19, a hot gas outlet valve 20 for the combustion chamber. The hot gas outlet pipe 19 for the combustion chamber is communicated with the inlet side 100M of the high-temperature dust removal filter. The circulation gas pipe 17 is communicated with the outlet side 100N of the high-temperature dust removal filter. The circulation fan 16 and circulation pipe 17 are provided for the preheating means 2 of the high-temperature dust removal filter first to utilize the heat discharged from the outlet side 100N of the high-temperature dust removal filter, and second to utilize the large gas amount of circulation gas to reduce the temperature difference between the inlet side 100M and the outlet side 100N of the high-temperature dust removal filter so that the filter elements of the high-temperature dust removal filter are more evenly preheated and under a small thermal stress.

A preheating bleed pipe 21 is connected to the hot gas outlet pipe 19 for the combustion chamber of the preheating means for the high-temperature dust removal filter. A bleed valve 22 is connected with the preheating bleed pipe. The preheating bleed pipe and the bleed valve are provided to bleed off unburned gas mixture before the preheating means reaches stable combustion, and when the combustion is stable, to switch hot gas produced by the combustion into the high-temperature dust removal filter. This prevents unburned gas mixture from entering the high-temperature dust removal filter and thus guarantees the safety of the high-temperature dust removal filter.

An exhaust gas bleed pipe 23 and bleed valve 24 are provided on the circulation pipe 17 of the preheating means 2 of the high-temperature dust removal filter.

The preheating means for the high-temperature dust removal filter has a gas flowmeter provided on each of its gas duct, combustible gas pipe and circulation gas pipe. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the preheating of the high-temperature dust removal filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

Figure 2:
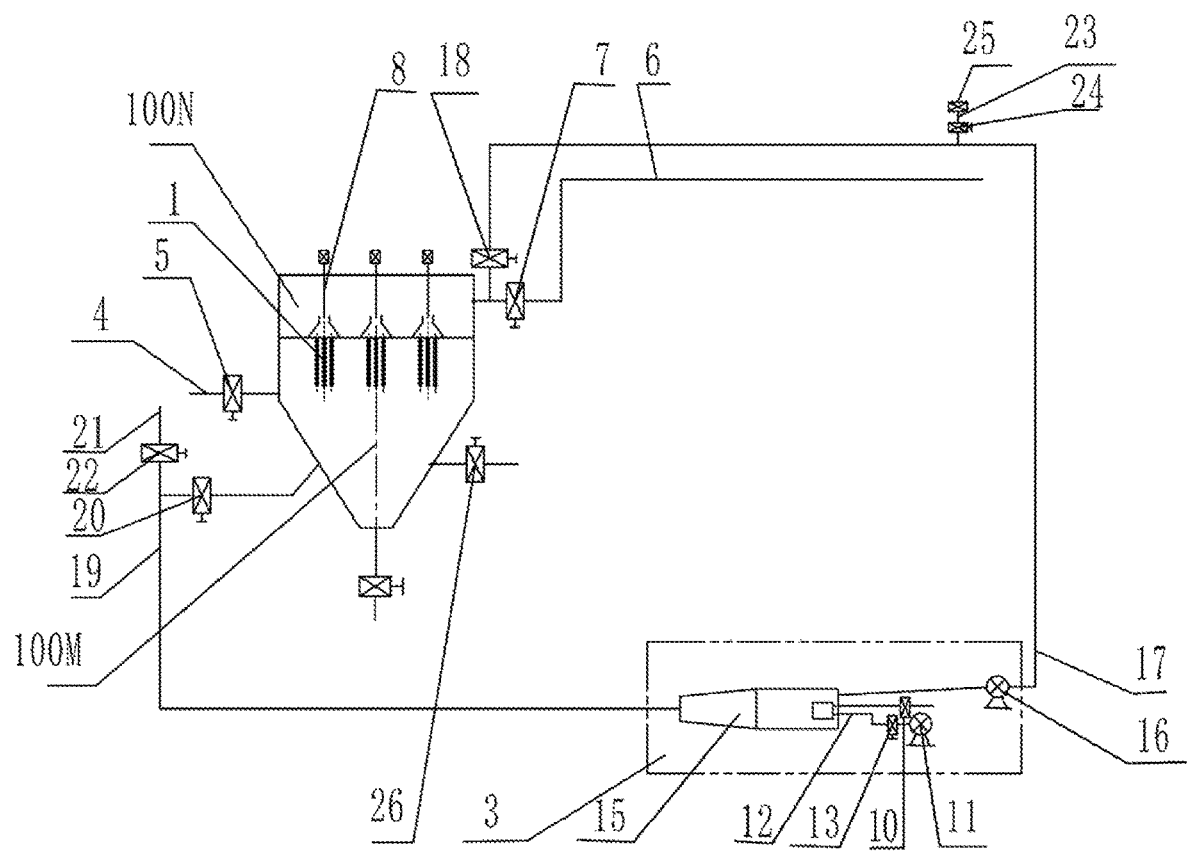
FIG. 2 is an structural schematic diagram of a set of high-temperature dust removal filter with a set of regeneration means according to embodiments of the present disclosure.

In some embodiments, as shown in FIG. 2:

The high-temperature dust removal and filtering apparatus includes a set of high-temperature dust removal filter (shown in FIG. 2) and a regeneration means 3 provided for regenerating the high-temperature dust removal filter. A filtering mechanism 1 is provided in the high-temperature dust removal filter. The filtering mechanism 1 divides the internal space of the high-temperature dust removal filter into a coal gas inlet side 100M and an outlet side 100N separated from each other. An inlet pipe 4 for unfiltered coal gas is provided on the high-temperature dust removal filter. A coal gas inlet valve 5 is provided on the inlet pipe. The coal gas inlet pipe 4 is communicated with the inlet side 100M of the high-temperature dust removal filter. An outlet pipe 6 for filtered coal gas is provided on the high-temperature dust removal filter. A coal gas outlet valve 7 is provided on the outlet pipe. The coal gas outlet pipe 6 is communicated with the outlet side 100N of the high-temperature dust removal filter. A back flushing system 8 is provided for the high-temperature dust removal filter. The back flushing medium of the back flushing system is dry coal gas without dust or tar, superheated steam, nitrogen or carbon dioxide. A coal gas replacement mechanism 26 is provided at the inlet side of the filter. The replacement gas of the replacement mechanism is superheated steam, nitrogen or carbon dioxide.

The regeneration means 3 for the high-temperature dust removal filter consists of a circulation pipe 17, a circulation fan 16, a blower 11, a gas gathering chamber 15 and a gas gathering pipe 19. The gas gathering pipe 19 is communicated with the inlet side 100M of the high-temperature dust removal filter. The circulation pipe 17 is communicated with the outlet side 100N of the high-temperature dust removal filter. A valve 18 is provided on the circulation pipe 17. By closing the outlet valve 7 and opening the circulation pipe valve 18 of the high-temperature dust removal filter, the gas from the outlet of the high-temperature dust removal filter is introduced into the circulation pipe 17 of the regeneration means 3. The circulation gas amount and the blowing amount of the blower are adjusted respectively by adjusting the frequencies of the circulation fan 16 and the blower 11. And the oxygen content in the gas entering the high-temperature dust removal filter is kept within a range from 0.5 to 5%. The combination of large gas amount and low oxygen content makes it possible to control the oxidation rate of oxidizable particles deposited on the outer surface of the filter elements of the high-temperature dust removal filter and control the temperature during the regeneration of the high-temperature dust removal filter, and makes it possible to uniformly regenerate multiple filter elements within the high-temperature dust removal filter. An inert gas replacement mechanism 26 is provided at the gas inlet side of the high-temperature dust removal filter. Before the high-temperature dust removal filter is regenerated, an inert gas or a non-oxidizing gas is used to replace the coal gas within the high-temperature dust removal filter. This further ensures the safety of the generation for the high-temperature dust removal filter.

An exhaust gas bleed pipe 23 and a bleed valve 24 are provided on the circulation pipe 17 of the regeneration means 3 of the high-temperature dust removal filter. A one-way valve 25 is provided on top of the exhaust gas bleed pipe 23 to only let the gas out but not in, so that excess exhaust gas is smoothly discharged from the bleed port.

The regeneration means for the high-temperature dust removal filter has a gas flowmeter provided on each of its gas duct, combustible gas pipe and circulation gas pipe. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the regeneration of the high-temperature dust removal filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

Figure 3:
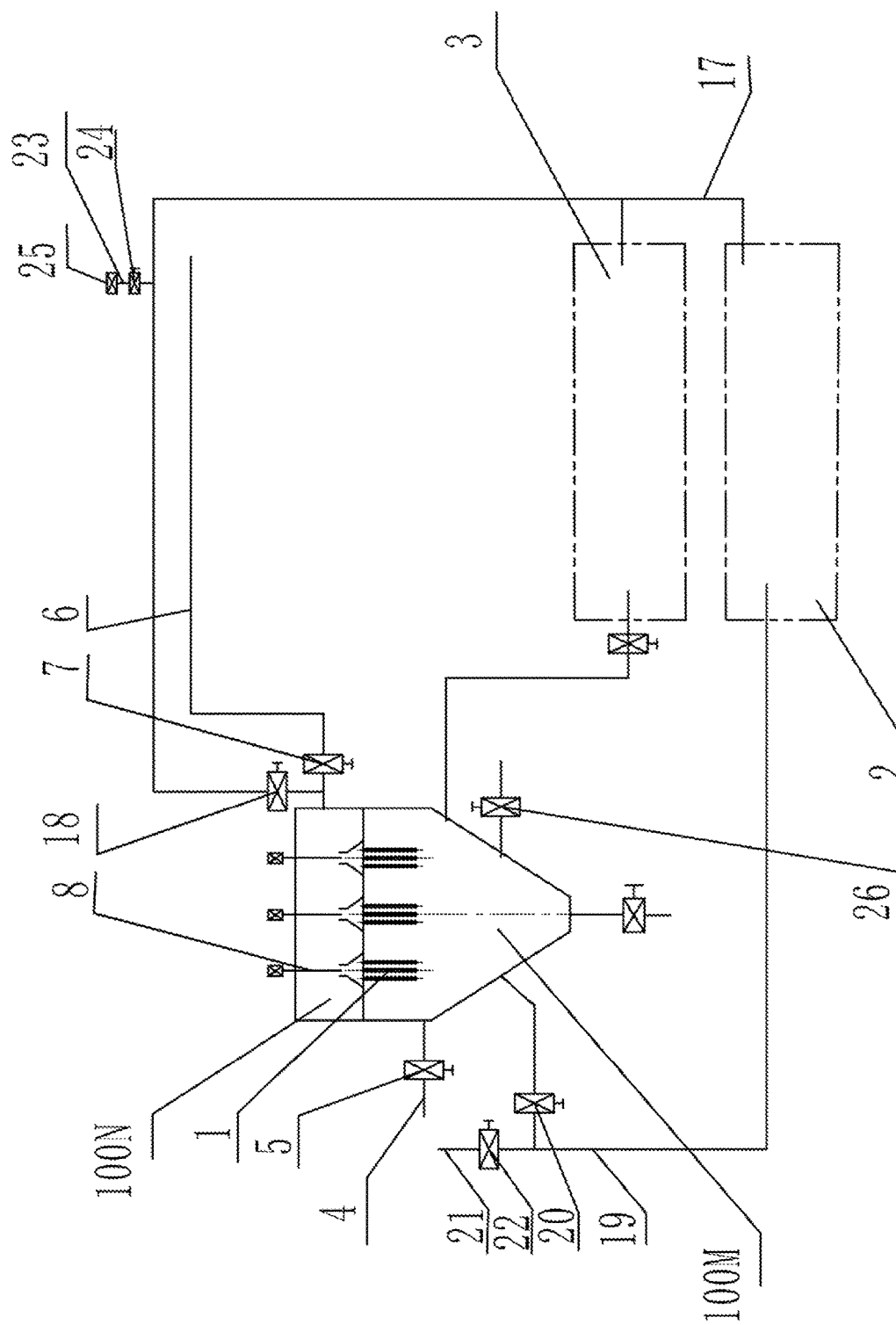
FIG. 3 is an structural schematic diagram of a set of high-temperature dust removal filter with a set of preheating means and a set of regeneration means according to embodiments of the present disclosure.

In some embodiments, as shown in FIG. 3:

These embodiments are formed by combination of above described embodiments together. These embodiments have the advantages of above described embodiments. The apparatus in FIG. 3 includes a set of high-temperature dust removal filter and a preheating means 2 and a regeneration means 3 respectively for preheating and regenerating the high-temperature dust removal filter. Both preheating and regeneration are provided in one set of high-temperature dust removal filter and the preheating means and the generation means are provided with circulation pipes, making preheating and regeneration more uniform. The preheating and regeneration of the high-temperature dust removal filter are less a problem. One set of high-temperature dust removal filter is capable of reliable operation for a long time.

Figure 4:
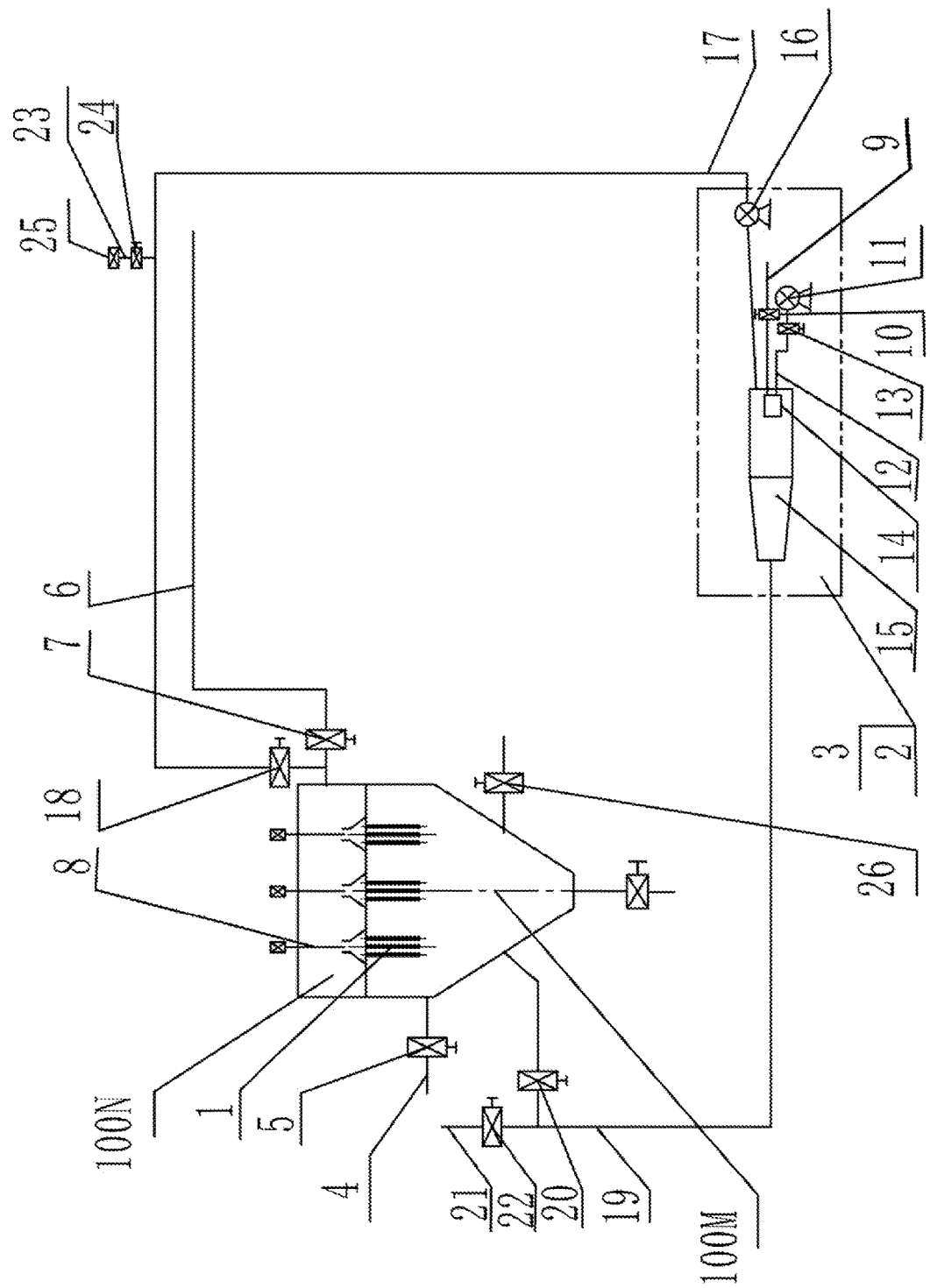
FIG. 4 is a structural schematic diagram of a set of high-temperature dust removal filter with a set of preheating means and a set of regeneration means integrated into one according to embodiments of the present disclosure.

In some embodiments, as shown in FIG. 4:

The high-temperature dust removal and filtering apparatus includes a set of high-temperature dust removal filter and a preheating and regeneration means integrating preheating and regeneration provided for the high-temperature dust removal filter. A filtering mechanism 1 is provided in the high-temperature dust removal filter. The filtering mechanism 1 divides the internal space of the high-temperature dust removal filter into a coal gas inlet side 100M and an outlet side 100N separated from each other. An inlet pipe 4 for unfiltered coal gas is provided on the high-temperature dust removal filter. A coal gas inlet valve 5 is provided on the inlet pipe. The coal gas inlet pipe 4 is communicated with the inlet side 100M of the high-temperature dust removal filter. An outlet pipe 6 for filtered coal gas is provided on the high-temperature dust removal filter. A coal gas outlet valve 7 is provided on the outlet pipe. The outlet pipe 6 for coal gas is communicated with the outlet side 100N of the high-temperature dust removal filter. A back flushing system 8 is provided for the high-temperature dust removal filter. A back flushing medium of the back flushing system is dry coal gas without dust or tar, superheated steam, nitrogen or carbon dioxide. A coal gas replacement mechanism 26 is provided at the inlet side of the filter. The replacement gas of the replacement mechanism is superheated steam, nitrogen or carbon dioxide.

The high-temperature dust removal filter integrates the preheating means 2 and the regeneration means 3 which share one set of means. That is to say, the combustion chamber 15 of the preheating means 2 is also the gas gathering chamber 15 of the regeneration means 3, the hot gas pipe 19 of the preheating means 2 is also the gas gathering pipe 19 of the regeneration means 3, they share the circulation pipe 17, the circulation fan 16 and the blower 11, an exhaust gas bleed pipe 21 and a bleed valve 22 are provided on the circulation pipe and a one-way valve 25 provided on top of the exhaust bleed pipe is shared. The integrated preheating and regeneration means can preheat and regenerate a set of filter. In heating the high-temperature dust removal filter, the combustion system is turned on first, then the circulation fan is started to exhaust excess air through the bleed pipe from the circulation pipe. In regeneration of the high-temperature dust removal filter, circulation fan is started first, and then blower is started to exhaust excess air through the bleed pipe from the circulation pipe. The integrated preheating and regeneration means provides the following beneficial effects. In addition to the aforementioned advantage provided by the circulation pipe, there are the following advantages. First, components are reduced, which saves investment and operation costs. Second, the structure is more compact, which saves space. A circulation fan and a circulation pipe are provided for the preheating and regeneration means of the high-temperature dust removal filter. The circulation gas comes from the outlet side of the high-temperature dust removal filter. The gas coming out from the outlet side is nearly oxygen-free gas in which oxygen is depleted after the combustibles are burned in the high-temperature dust removal filter. Then most of the circulation gas from the outlet side passes through the circulation pipe and the circulation fan, to the combustion chamber or the gas gathering chamber and then to the inlet side of the high-temperature dust removal filter after being mixed in the hot gas pipe or the gas gathering pipe. Such structure makes the preheating means and the regeneration means obviously economically competitive over other forms. The large gas amount brought by the circulation pipe increases advantages of overall preheating and overall regeneration to the high-temperature dust removal filter. The heating and regeneration of the entire internal cavity of the filter by a large gas amount is no way that any other preheating and regeneration forms can compete with. The heat transfer and regeneration are featured by direct contact type, large gas amount, zero dead angle, uniformity and controllability, large and quick heat transfer, and quick regeneration, so that the temperatures at the inlet side and the outlet side of the filter are close to each other during the entire preheating and regeneration. Normally, the overall temperature difference between the inlet side and the outlet side is no more than 20° C. The thermal stress inside the entire high-temperature dust removal filter is very small, and thus the filtering mechanism is not likely to be damaged, let alone local unbalanced temperatures. Besides, the coal gas will have a relatively stable property, and this greatly reduces phenomenons of tar gas precipitation, coking and condensation within the high-temperature dust removal filter.

The preheating and regeneration means for the high-temperature dust removal filter has a gas flowmeter provided on each of its gas duct, combustible gas pipe and circulation gas pipe. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the preheating and regeneration of the high-temperature dust removal filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

Figure 5:
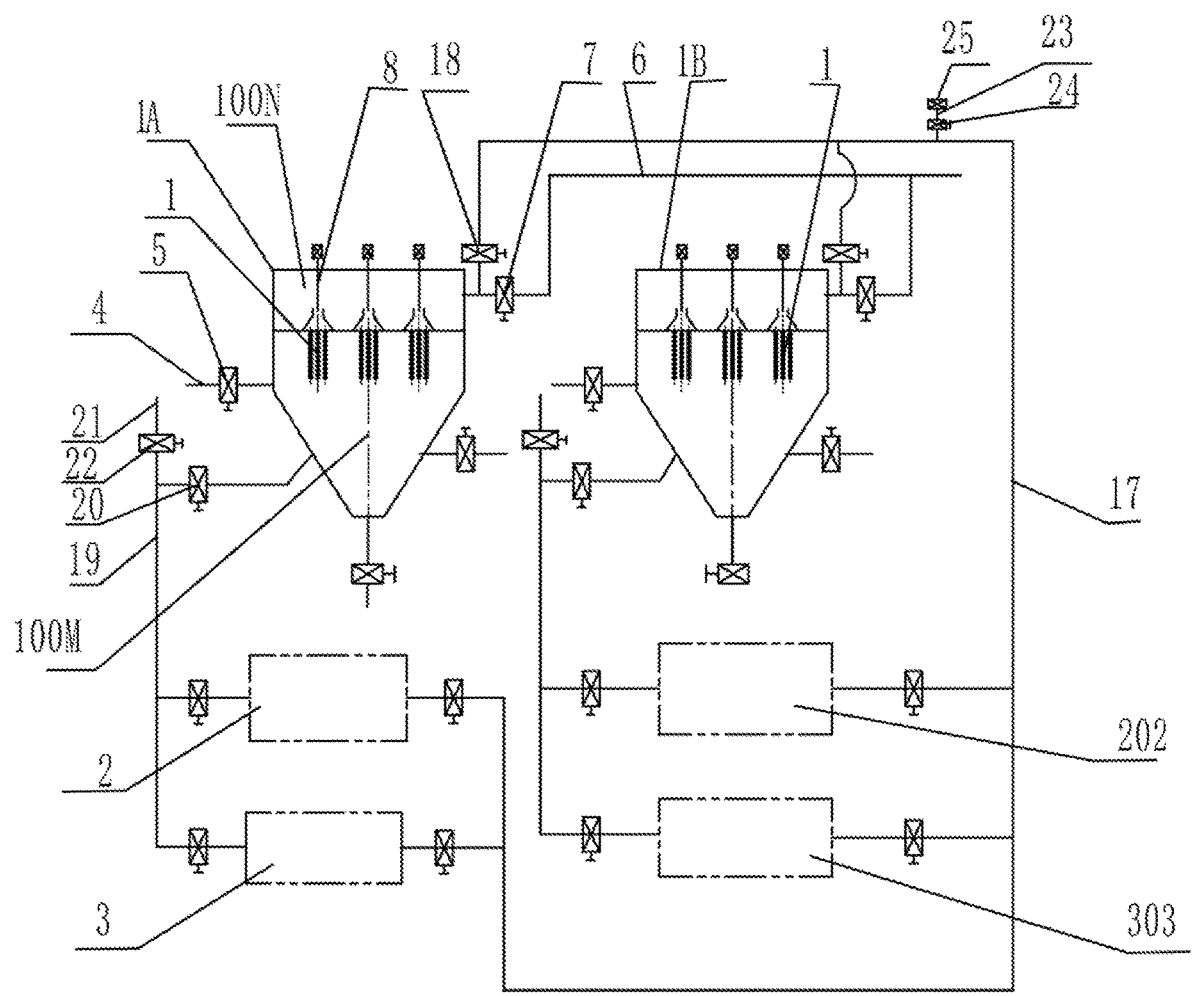
FIG. 5 is a structural schematic diagram of an embodiment of two sets of high-temperature dust removal filters respectively with a preheating means and a regeneration means according to embodiments of the present disclosure.

In some embodiments, as shown in FIG. 5:

The high-temperature dust removal and filtering system includes two sets of parallel high-temperature dust removal filters (1A/1B). Each set of filter is separately provided with a preheating means (2, 202) and a regeneration means (3, 303). The system is characterized in that there is always one filter being filtering state. This is because by switching pipe valves for preheating or regeneration, one high-temperature dust removal filter can be switched to be normal filtering state. The high-temperature dust removal filters (1A/1B) being parallel means that the inlet pipes for unfiltered coal gas of the filters are parallel and the outlet pipes for filtered coal gas of the filters are parallel. Each of the preheating means (2, 202) and the regeneration means (3, 303) is provided with a circulation pipe 17. Either in the preheating means or in the regeneration means, the circulation pipe plays a unique role in the present disclosure and is significantly useful for the high-temperature dust removal filters for the following reasons. First, in preheating a high-temperature dust removal filter, the gas coming from the combustion chamber of the preheating means and entering the inlet side of the high-temperature dust removal filter has a decreased or moderate temperature compared with the temperature of the flame created by fuel burning, as the circulation gas amount is normally more than 3 times of the blowing amount. Second, in preheating a high-temperature dust removal filter, most of the gas coming out from the outlet side of the high-temperature dust removal filter enters the inlet side of the high-temperature dust removal filter via the circulation fan and the circulation pipe, achieving reuse of heat, which is energy-saving and environmentally friendly. Third, for the first and second reasons, the temperature difference is small between the inlet side and the outlet side of the high-temperature dust removal filter. Fourth, in regenerating a high-temperature dust removal filter, it is easy to keep the oxygen content within 5% in the regeneration gas entering the high-temperature dust removal filter as the circulation gas amount is normally equal to or more than 3 times of the blowing amount, which reliably guarantees the safety of the regeneration. Fifth, in preheating and regenerating a high-temperature dust removal filter, with the addition of the circulation fan and the circulation pipe, either for the preheating or the regeneration of the high-temperature dust removal filter, the overall air amount is enough for heat exchange or regeneration in a contact-type, large gas amount and no dead angle manner between the gas and various parts of the inlet side and the outlet side of the high-temperature dust removal filter. In this way, the heat exchange or regeneration at the various parts would be uniform with a small temperature difference, and it is easier to control the temperature. Therefore, it is very necessary to provide a circulation fan and a circulation pipe for a high-temperature dust removal filter. With a circulation fan and a circulation pipe, it is more possible to equip the filter with overall preheating and regeneration and thus it is further guaranteed that the high-temperature dust removal and filtering apparatus may continuously work.

The preheating means and regeneration means for the high-temperature dust removal filter have a gas flowmeter provided on their respective gas ducts, combustible gas pipes and circulation gas pipes. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the preheating and regeneration of the high-temperature dust removal filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

Figure 6:
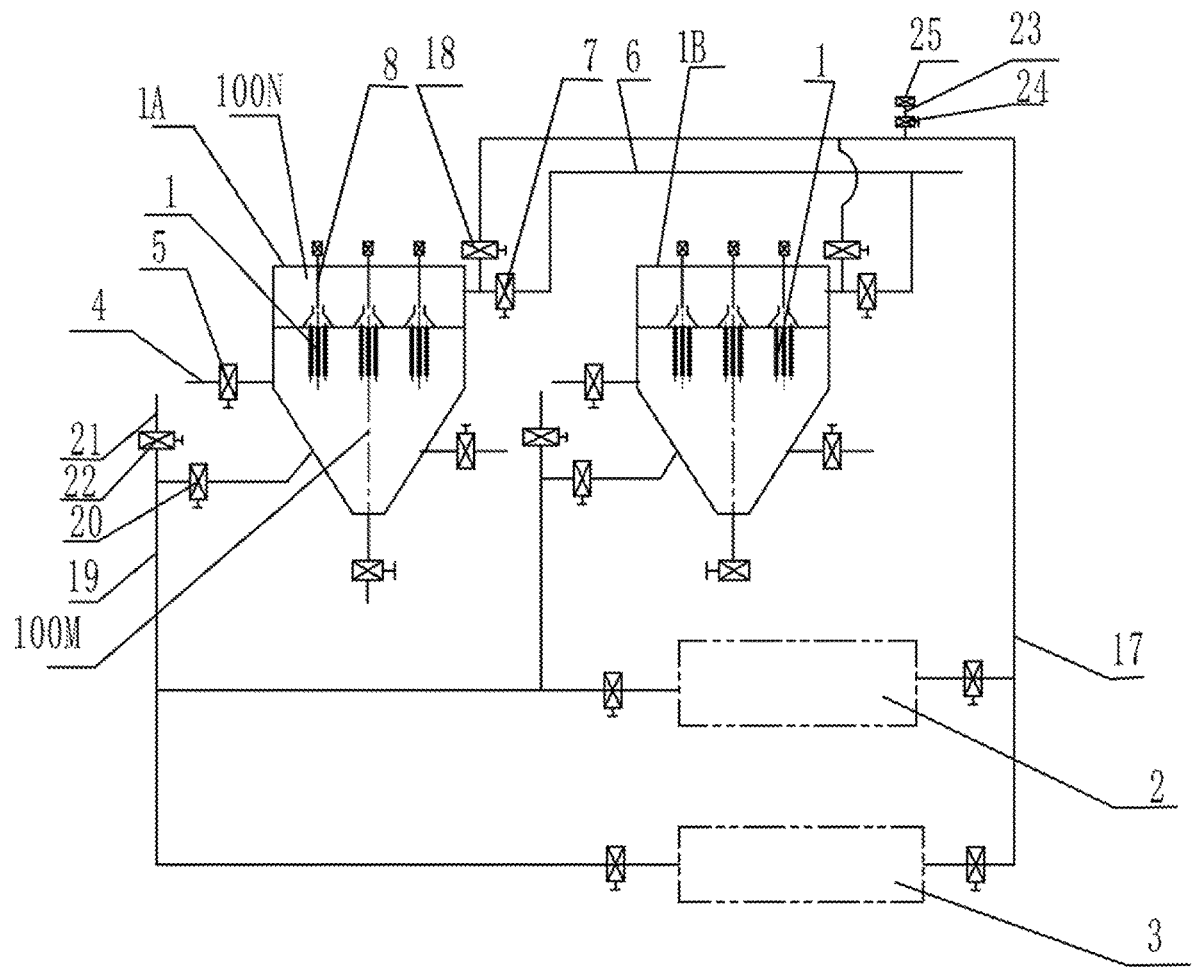
FIG. 6 is a structural schematic diagram of an embodiment of two sets of high-temperature dust removal filters with a set of preheating means and regeneration means according to embodiments of the present disclosure.

In some embodiments, as shown in FIG. 6:

The high-temperature dust removal and filtering system includes two sets of parallel high-temperature dust removal filters (1A/1B) and one set of preheating means 2 and one set of regeneration means 3 respectively for preheating and regeneration for both sets of high-temperature dust removal filters. The system is characterized in that there is always one set of filters being in the filtering state. This is because by switching pipe valves for preheating and regeneration, one high-temperature dust removal filter can be switched to be normal filtering state. Embodiment 6 is functionally identical with Embodiment 5. But compared with Embodiment 5, Embodiment 6 saves one set of preheating means and one set of regeneration means, and thus saves the space occupied by the apparatus and also saves investment.

Figure 7:
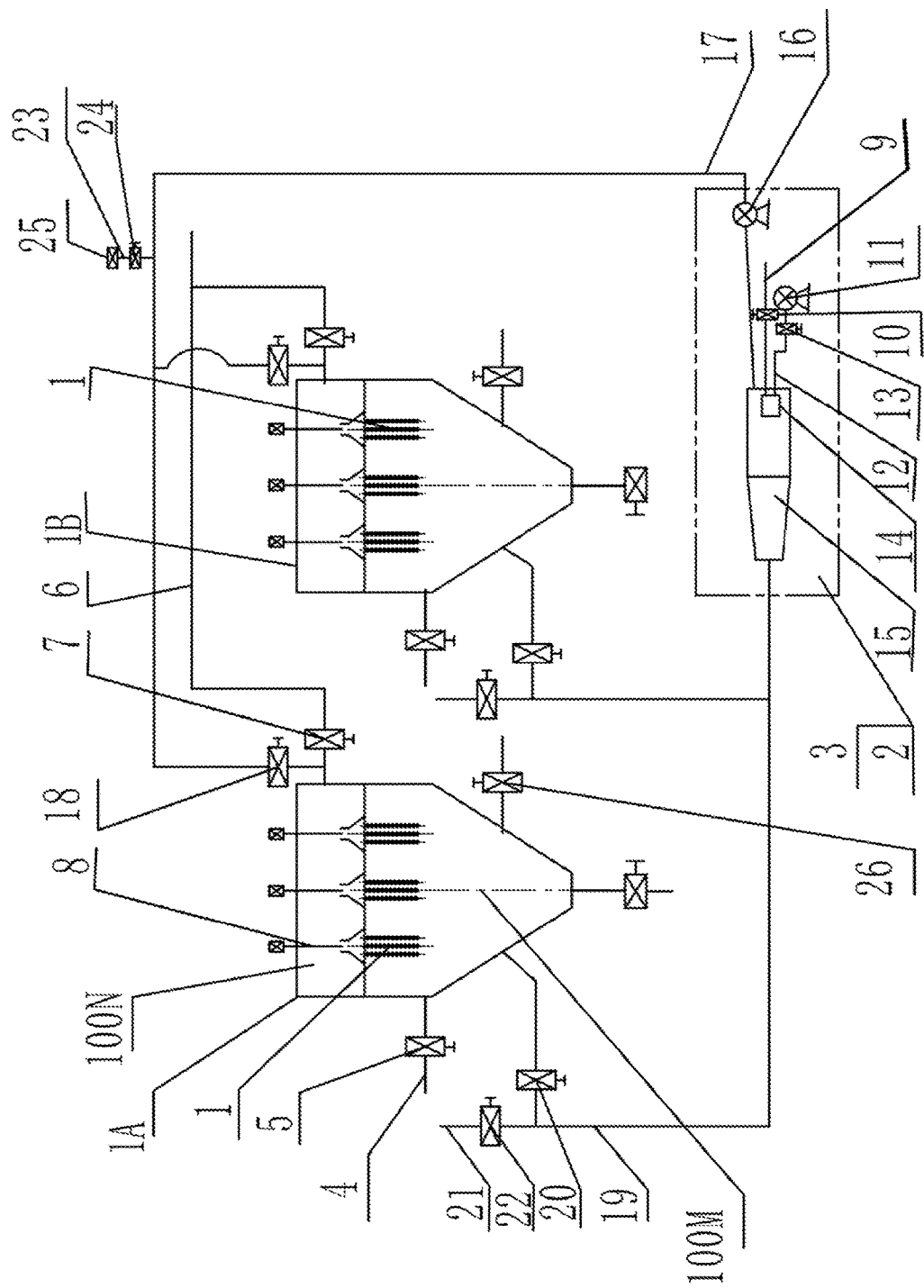
FIG. 7 is a structural schematic diagram of an embodiment of two sets of high-temperature dust removal filters with a set of preheating means and a set of regeneration means integrated into one according to embodiments of the present disclosure.

In some embodiments, as shown in FIG. 7:

The high-temperature dust removal and filtering system includes two sets of parallel high-temperature dust removal filters (1A/1B) and a preheating means 2 and a regeneration means 3 capable of both preheating and regeneration provided for both high-temperature dust removal filters (1A/1B). The preheating means and the regeneration means are integrated into one, i.e. constitute an integrated preheating and regeneration means (2 and 3) which can preheat or regeneration either one of the two parallel high-temperature dust removal filters (1A/1B). The system is characterized in that there is always one set of high-temperature dust removal filter being in filtering state. This is because by switching pipe valves for preheating or regeneration, one set of high-temperature dust removal filter can be switched be to normal filtering state. A filtering mechanism 1 is provided in the high-temperature dust removal filter. The filtering mechanism 1 divides the internal space of the high-temperature dust removal filter into a coal gas inlet side 100M and an outlet side 100N separated from each other. An inlet pipe 4 for unfiltered coal gas is provided on the high-temperature dust removal filter. A coal gas inlet valve 5 is provided on the inlet pipe. The coal gas inlet pipe 4 is communicated with the inlet side 100M of the high-temperature dust removal filter. An outlet pipe 6 for filtered coal gas is provided on the high-temperature dust removal filter. A coal gas outlet valve 7 is provided on the outlet pipe. The coal gas outlet pipe 6 is communicated with the outlet side 100N of the high-temperature dust removal filter. A back flushing system 8 is provided for the high-temperature dust removal filter. A back flushing medium of the back flushing system is dry coal gas without dust or tar, superheated steam, nitrogen or carbon dioxide. A coal gas replacement mechanism 26 is provided at the inlet side of the filter. A replacement gas of the replacement mechanism is superheated steam, nitrogen or carbon dioxide.

The preheating means 2 for high-temperature dust removal filter and the filter element regeneration means 3 are integrated, which share one set of means. That is to say, the combustion chamber 15 of the preheating means 2 is also the gas gathering chamber 15 of the regeneration means 3, the hot gas pipe 19 of the preheating means 2 is also the gas gathering pipe 19 of the regeneration means 3, they share the circulation pipe 17, the circulation fan 16 and the blower 11, an exhaust gas bleed pipe 21 and a bleed valve 22 are provided on the circulation pipe and a one-way valve 25 on top of the exhaust bleed pipe is shared. The integrated preheating and regeneration means can preheat and regenerate two sets of the filters respectively. In heating a high-temperature dust removal filter, the combustion system is turned on first, then the circulation fan is started to exhaust excess air through the bleed pipe from the circulation pipe. In regeneration of the high-temperature dust removal filter, circulation fan is started first, and then blower is started to exhaust excess air through the bleed pipe from the circulation pipe. The integrated preheating and regeneration means provides the following beneficial effects. In addition to the aforementioned advantage provided by the circulation pipe, there are the following advantages. First, components are further reduced, which saves investment and operation costs.

Second, the structure is more compact, which saves space. A circulation fan and a circulation pipe are provided for the preheating and regeneration means of the high-temperature dust removal filter. The circulation gas comes from the outlet side of the high-temperature dust removal filter. The gas coming out from the outlet side is nearly oxygen-free gas in which oxygen is depleted after the combustibles are burned in the high-temperature dust removal filter. Then most of the circulation gas from the outlet side passes through the circulation pipe and the circulation fan, to the combustion chamber or the gas gathering chamber and then to the inlet side of the high-temperature dust removal filter after being mixed in the hot gas pipe or the gas gathering pipe. Such structure makes the preheating means and the regeneration means obviously economically competitive over other forms. The heating and regeneration of the entire internal cavity of the filter by the large gas amount of the circulation pipe is no way that any other preheating and regeneration forms can compete with. The heat transfer and regeneration are featured by direct contact type, large gas amount, zero dead angle, uniformity and controllability, large and quick heat transfer, and quick regeneration, so that the temperatures at the inlet side and the outlet side of the filter are close to each other during the entire preheating and regeneration. Normally, the overall temperature difference between the inlet side and the outlet side is no more than 20° C. The thermal stress inside the entire high-temperature dust removal filter is very small, and thus the filtering mechanism is not likely to be damaged, let alone local unbalanced temperatures. Besides, the coal gas will have a relatively stable property, and this greatly reduces phenomena of tar gas precipitation, coking and condensation within the high-temperature dust removal filter.

The preheating and regeneration means for the high-temperature dust removal filter has a gas flowmeter provided on each of its gas duct, combustible gas pipe and circulation gas pipe. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the preheating and regeneration of the high-temperature dust removal filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

The high-temperature dust removal and filtering system consists of two sets of high-temperature dust removal filters and a preheating means and a regeneration means for preheating and regenerating the two sets of high-temperature dust removal filters. A method for continuous dust removal and filtering include steps:

(1) preheating 1A, stopping preheating 1A when the preheating is satisfactory, switching a pipe valve to introduce unfiltered coal gas into the high-temperature dust removal filter 1A;

(2) back flushing, by a pulse back flushing system, in sequence when the high-temperature dust removal filter 1A is in normal filtration state;

(3) preheating the high-temperature dust removal filter 1B once the filtering capacity of the high-temperature dust removal filter 1A decreases to a certain level, stopping preheating 1B when the preheating is satisfactory, switching the pipe valve to introduce unfiltered coal gas into the high-temperature dust removal filter 1B, back flushing in sequence by the pulse back flushing system of 1B, closing the coal gas inlet valve to 1A and closing the pulse back flushing system of 1A, opening the gas replacement valve of 1A to replace the coal gas within 1A, in which case the replaced gas enters the coal gas outlet pipe, closing the replacement valve of 1A when the replacement is satisfactory, closing the coal gas outlet valve of 1A to regenerate 1A; and (4) once the filtering capacity of the high-temperature dust removal filter 1B decreases to a certain level and the regeneration of high-temperature dust removal filter 1A is satisfactory, switching the pipe valve to introduce unfiltered coal gas into the high-temperature dust removal filter 1A, back flushing in sequence by the pulse back flushing system of 1A, closing the coal gas inlet valve to high-temperature dust removal filter 1B and closing the pulse back flushing system of 1B, opening the gas replacement valve of 1B for replacement in 1B, in which case the replaced gas enters the coal gas outlet pipe, when the replacement is satisfactory, closing the coal gas outlet valve of 1B to regenerate 1B. In this way, the filtering goes on and on.

Figure 8:
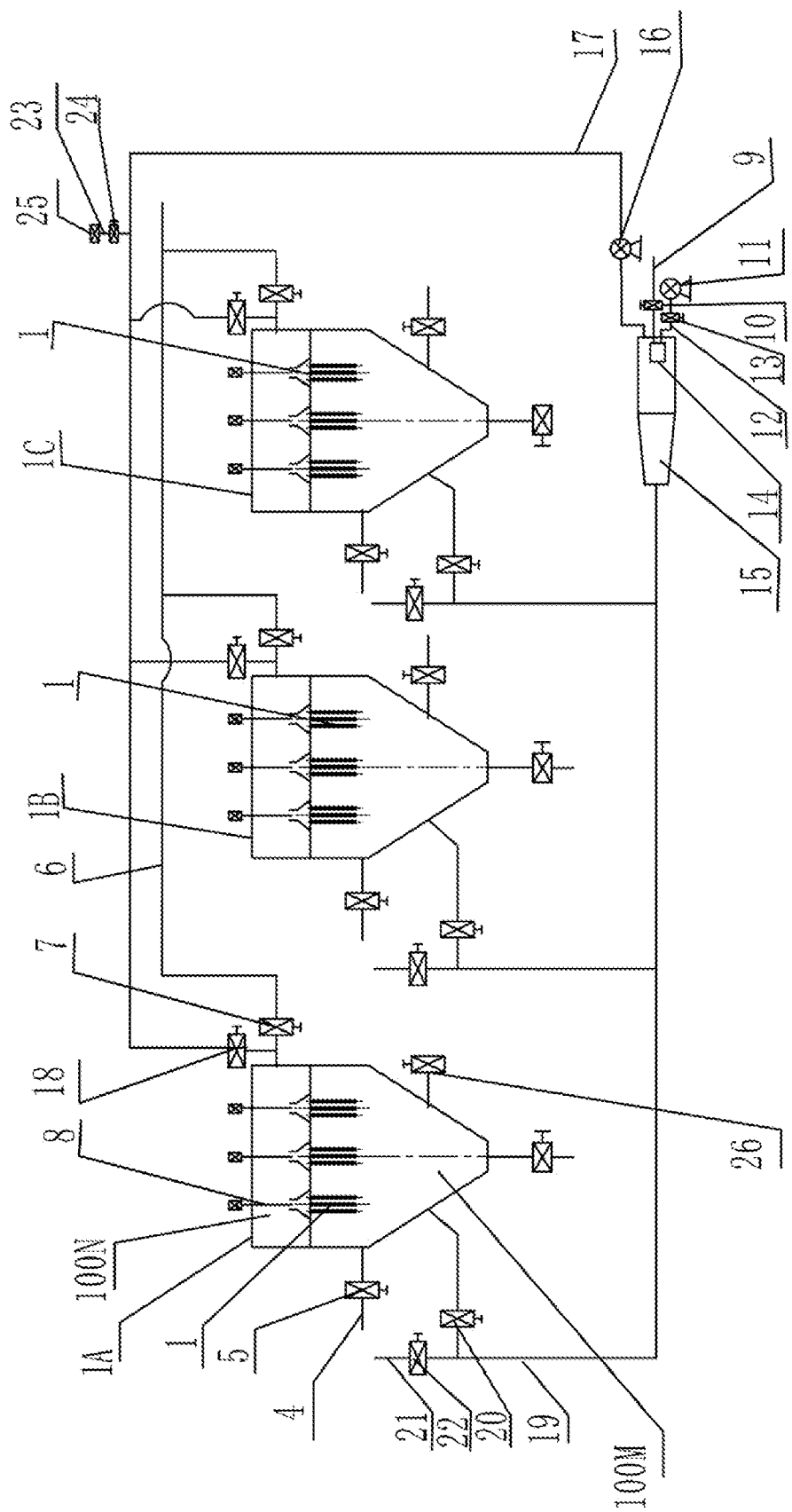
FIG. 8 is a structural schematic diagram of an embodiment of three sets of high-temperature dust removal filters with a set of preheating means and a set of regeneration means integrated into one according to embodiments of the present disclosure.

In some embodiments, as shown in FIG. 8:

The high-temperature dust removal and filtering system consists of three sets of (1A/1B/1C) or more sets of parallel high-temperature dust removal filters and an integrated preheating and regeneration means (2 and 3) with integrated preheating and regeneration functions provided to be shared by the three or more sets of high-temperature dust removal filters. The system is characterized in that there is always one set of filter being in filtering state. This is because by switching the pipe valve for preheating or regeneration, one set of high-temperature dust removal filter can be switched to be normal filtering state.

A filtering mechanism 1 is provided in the high-temperature dust removal filter. The filtering mechanism 1 divides the internal space of the high-temperature dust removal filter into a coal gas inlet side 100M and an outlet side 100N separated from each other. An inlet pipe 4 for unfiltered coal gas is provided on the high-temperature dust removal filter. A coal gas inlet valve 5 is provided on the inlet pipe. The coal gas inlet pipe 4 is communicated with the inlet side 100M of the high-temperature dust removal filter. An outlet pipe 6 for filtered coal gas is provided on the high-temperature dust removal filter. A coal gas outlet valve 7 is provided on the outlet pipe. The coal gas outlet pipe 6 is communicated with the outlet side 100N of the high-temperature dust removal filter. A back flushing system 8 is provided for the high-temperature dust removal filter. A back flushing medium of the back flushing system is dry coal gas without dust or tar, superheated steam, nitrogen or carbon dioxide. A coal gas replacement mechanism 26 is provided at the inlet side of the filter. A replacement gas of the replacement mechanism is superheated steam, nitrogen or carbon dioxide.

The preheating means 2 for high-temperature dust removal filter and the filter element regeneration means 3 are integrated, which share one set of means. That is to say, the combustion chamber 15 of the preheating means 2 is also the gas gathering chamber 15 of the regeneration means 3, the hot gas pipe 19 of the preheating means 2 is also the gas gathering pipe 19 of the regeneration means 3, they share the circulation pipe 17, the circulation fan 16 and the blower 11, an exhaust gas bleed pipe 21 and a bleed valve 22 are provided on the circulation pipe and a one-way valve 25 on top of the exhaust bleed pipe is shared. The integrated preheating and regeneration means can preheat and regenerate three sets of the filters, respectively. In heating a high-temperature dust removal filter, the combustion system is turned on first, then the circulation fan is started to exhaust excess air through the bleed pipe from the circulation pipe. In regeneration of the high-temperature dust removal filter, circulation fan is started first, and then blower is started to exhaust excess air through the bleed pipe from the circulation pipe. The integrated preheating and regeneration means provides the following beneficial effects. In addition to the aforementioned advantage provided by the circulation pipe, there are the following advantages. First, components are reduced, which saves investment and operation costs. Second, the structure is more compact, which saves space. A circulation fan and a circulation pipe are provided for the preheating and regeneration means of the high-temperature dust removal filter. The circulation gas comes from the outlet side of the high-temperature dust removal filter. The gas coming out from the outlet side is nearly oxygen-free gas in which oxygen is depleted after the combustibles are burned in the high-temperature dust removal filter. Then most of the circulation gas from the outlet side passes through the circulation pipe and the circulation fan, to the combustion chamber or the gas gathering chamber and then to the inlet side of the high-temperature dust removal filter after being mixed in the hot gas pipe or the gas gathering pipe. Such structure makes the preheating means and the regeneration means obviously economically competitive over other forms. The heating and regeneration of the entire internal cavity of the filter by the large gas amount is no way that any other preheating and regeneration forms can compete with. The heat transfer and regeneration are featured by direct contact type, large gas amount, zero dead angle, uniformity and controllability, large and quick heat transfer, and quick regeneration, so that the temperatures at the inlet side and the outlet side of the filter are close to each other during the entire preheating and regeneration. Normally, the overall temperature difference between the inlet side and the outlet side is no more than 20° C. The thermal stress inside the entire high-temperature dust removal filter is very small, and thus the filtering mechanism is not likely to be damaged, let alone local unbalanced temperatures. Besides, the coal gas will have a relatively stable property, and this greatly reduces phenomenons of tar gas precipitation, coking and condensation within the high-temperature dust removal filter.

The preheating and regeneration means for the high-temperature dust removal filter has a gas flowmeter provided on each of its gas duct, combustible gas pipe and circulation gas pipe. The flowmeter is provided to control the flow rate of each gas and the ratios thereof in real time. The high-temperature dust removal filter has a temperature measuring means and a pressure measuring means provided at the inlet side and the outlet side so as to control the temperature and pressure of the preheating and regeneration of the high-temperature dust removal filter.

The outer side and/or inner side of the housing of the high-temperature dust removal filter is wrapped with thermal insulation materials so as to provide thermal insulation for the housing and thus tar is not likely to precipitate from the oil gas of coal pyrolysis on the housing.

The high-temperature dust removal and filtering system consists of three sets (1A/1B/1C) or more sets (not shown) of parallel high-temperature dust removal filters and an integrated preheating and regeneration means (2 and 3) with integrated preheating and regeneration functions provided to be shared by the three or more sets of high-temperature dust removal filters. A method for continuous dust removal and filtering include steps:

1. Taking three sets (1A, 1B and 1C) as an example

The first method is that 1A and 1B work normally and 1C is standby. Such method and steps of continuous dust removal and filtering are substantially similar to the above embodiment, except that a high-temperature dust removal filter is used for standby here, making continuous dust removal and filtering more reliable.

The second method is that two sets of high-temperature dust removal filters work for filtration each time. More filters being in filtration state increases the overall filtering capacity of the filter, which saves investment and makes it possible to simultaneously preheat any two high-temperature dust removal filters, 1A and 1B, or 1A and 1C, or 1B and 1C.

(1) For example, first preheating 1A and 1B to a temperature as that of unfiltered coal gas to be received so that tar containing coal gas in the high-temperature dust removal filters 1A and 1B do not undergo precipitation on filter elements of the high-temperature dust removal filters 1A and 1B due to low temperature, stopping the preheating means by switching the pipe valve and opening the coal gas inlet and outlet pipes of 1A and 1B so as to introduce coal gas into the high-temperature dust removal filters 1A and 1B, while keeping all other pipe valves closed;

(2) back flushing, by the pulse back flushing systems of 1A and 1B, in sequence when high-temperature dust removal filters 1A and 1B are in normal filtration state;

(3) preheating 1C which is in a cold condition when filtration in 1A and 1B reaches a certain degree and the pressure differences between the inlet and outlet sides of the high-temperature dust removal filters reach a certain value, stopping preheating 1C when the preheating of 1C is satisfactory, opening the coal gas inlet and outlet pipes of 1C to switch coal gas into the high-temperature dust removal filter 1C, back flushing in sequence by a pulse back flushing system of 1C, closing other pipes of 1C, then closing coal gas inlet pipe with a relatively large pressure difference between the inlet and outlet sides of the two high-temperature dust removal filters 1A and 1B, e.g. in the case the coal gas inlet pipe of 1A, closing the pulse back flushing system of 1A, and at this point, opening an inert gas valve of 1A for replacement to replace the coal gas in 1A into the coal gas outlet pipe, closing the coal gas outlet pipe of 1A when the gas in 1A is replaced to create a safe condition, closing the inert gas pipe valve of 1A for replacement, opening the regeneration means of 1A, in which period 1B and 1C are working for filtration; and (4) closing regeneration pipe of 1A when regeneration of 1A is done and 1B needs regeneration, opening the coal gas inlet and outlet valves of 1A, back flushing in sequence by the pulse back flushing system of 1A, closing the coal gas inlet valve of 1B, closing the pulse back flushing system of 1B, opening a replacement valve of 1B, in which case the replaced gas enters the coal gas outlet pipe, closing the replacement valve of 1B when the replacement for 1B is satisfactory, closing the coal gas outlet valve of 1B, opening the regeneration means of 1B to regenerate 1B, at which point 1A and 1C are working for filtration, and so on.

2. Four or more sets of high-temperature dust removal filters and preheating means and regeneration means respectively for preheating and regenerating the high-temperature dust removal filters constitute a high-temperature dust removal and filtering system (not shown as figures). And it has a similar method as Embodiment 1. The more filters are put into service, the less the total investment is.

The above description is only a few embodiments of the present disclosure, and the present disclosure is not limited thereto, and various changes, substitutions and modifications may be made to the apparatus of the present disclosure as needed. Any modifications, equivalent substitutions, improvements, etc. made within the spirit and scope of the disclosure fall in the scope of the present disclosure.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A high-temperature dust removal and filtering apparatus, comprising a high-temperature dust removal filter, wherein,
   a filtering mechanism is provided in the high-temperature dust removal filter, and the filtering mechanism divides an internal space of the high-temperature dust removal filter into a coal gas inlet side and a coal gas outlet side separated from each other,
   an inlet pipe for unfiltered coal gas is provided on the high-temperature dust removal filter,
   a coal gas inlet valve is provided on the coal gas inlet pipe, the coal gas inlet pipe is communicated with the coal gas inlet side of the high-temperature dust removal filter,
   an outlet pipe for filtered coal gas is provided on the high-temperature dust removal filter, a coal gas outlet valve is provided on the coal gas outlet pipe, the coal gas outlet pipe is communicated with the coal gas outlet side of the high-temperature dust removal filter, and
   a back flushing system for filtration is provided at the coal gas outlet side of the high-temperature dust removal filter,
   wherein the high-temperature dust removal and filtering apparatus further comprises a preheating means and a regeneration means able to preheat and regenerate the high-temperature dust removal filter, respectively, wherein the preheating means and the regeneration means are disposed within a circulation loop with the coal gas inlet side and the coal gas outlet side of the high-temperature dust removal filter through a circulation pipe; and
   wherein the preheating means for the high-temperature dust removal filter consists of a fuel pipe, a fuel valve, a blower, a gas duct, a gas valve, a burner nozzle, a combustion chamber, a circulation fan, the circulation pipe, a circulation valve, and a hot gas outlet pipe for the combustion chamber, the hot gas outlet pipe for the combustion chamber being communicated with the coal gas inlet side of the high-temperature dust removal filter, and the circulation fan being communicated with the circulation pipe and connected, through the circulation pipe, to the combustion chamber at one end and to the coal gas outlet side of the high-temperature dust removal filter at the other end.

2. The apparatus according to claim 1, wherein the regeneration means for the high-temperature dust removal filter consists of the circulation pipe, the circulation fan, the blower, a gas gathering chamber and a gas gathering pipe, and wherein the gas gathering pipe is connected to the coal gas inlet side of the high-temperature dust removal filter, a valve is provided on the gas gathering pipe, the circulation fan is communicated with the circulation pipe and is connected, through the circulation pipe, to the gas gathering chamber at one end and to the coal gas outlet side of the high-temperature dust removal filter at the other end, and a valve is provided on the circulation pipe.

3. The apparatus according to claim 1, wherein the preheating means and the regeneration means of the high-temperature dust removal filter are integrated into one piece and share one set of components,
wherein the one set of shared components comprises the combustion chamber of the preheating means which is also a gas gathering chamber of the regeneration means, the hot gas outlet pipe of the preheating means is also a gas gathering pipe of the regeneration means, and the one set of shared components further comprises the circulation pipe, the circulation fan and the blower.

4. The apparatus according to claim 3, wherein
the regeneration means for the high-temperature dust removal filter consists of the circulation pipe, the circulation fan, the blower, the gas gathering chamber and the gas gathering pipe, wherein the gas gathering pipe is connected to the coal gas inlet side of the high-temperature dust removal filter, a valve is provided on the gas gathering pipe, the circulation fan is communicated with the circulation pipe and is connected, through the circulation pipe, to the gas gathering chamber at one end and to the coal gas outlet side of the high-temperature dust removal filter at the other end, and a valve is provided on the circulation pipe; and
an exhaust gas bleed pipe and an exhaust gas bleed valve are provided on the circulation pipe of the preheating means and the regeneration means of the high-temperature dust removal filter, and a one-way valve is provided on top of the exhaust gas bleed pipe.

5. The apparatus according to claim 3, wherein the preheating means and the regeneration means of the high-temperature dust removal filter are integrated into one piece and configured to work as follows: in heating the high-temperature dust removal filter, turning on the burner nozzle first, then starting the circulation fan and exhausting excess air through a bleed pipe from the circulation pipe; in regeneration of the high-temperature dust removal filter, starting the circulation fan first, and then starting the blower and exhausting excess air through a bleed pipe from the circulation pipe.

6. The apparatus according to claim 1, wherein a preheating bleed pipe is connected to the hot gas outlet pipe for the combustion chamber of the preheating means for the high-temperature dust removal filter, and a bleed valve is connected to the preheating bleed pipe.

7. The apparatus according to claim 1, wherein an exhaust gas bleed pipe and an exhaust gas bleed valve are provided on the circulation pipe of the preheating means and the regeneration means of the high-temperature dust removal filter, and a one-way valve is provided on top of the exhaust gas bleed pipe.

8. The apparatus according to claim 1, wherein a gas replacement mechanism is provided at the coal gas inlet side of the high-temperature dust removal filter.

9. The apparatus according to claim 1, wherein a gas medium used by the back flushing system is dry coal gas without dust or tar, superheated steam, nitrogen or carbon dioxide.

10. The apparatus according to claim 8, wherein a gas medium used by the gas replacement mechanism is superheated steam, nitrogen or carbon dioxide.

11. The apparatus according to claim 1, wherein the preheating means for the high-temperature dust removal filter has a gas flowmeter provided on each of the gas duct, the fuel pipe and the circulation pipe.

12. The apparatus according to claim 1, wherein the high-temperature dust removal filter has a temperature measuring means and a pressure measuring means provided at each of the coal gas inlet side and the coal gas outlet side.

13. The apparatus according to claim 1, wherein an outer side and/or an inner side of a housing of the high-temperature dust removal filter is wrapped by thermal insulation materials so as to provide thermal insulation for the housing.

14. A high-temperature dust removal and filtering system, wherein the high-temperature dust removal and filtering system comprises two or more sets of the high-temperature dust removal and filtering apparatuses according to claim 1 connected in parallel, wherein the filters connected in parallel share one set of preheating means and one set of regeneration means.

15. The high-temperature dust removal and filtering system according to claim 14, wherein the preheating means, the regeneration means or an integrated preheating and regeneration means are disposed on the circulation loop.

16. The high-temperature dust removal and filtering system according to claim 14, wherein
the regeneration means for the high-temperature dust removal filter consists of a circulation pipe, a circulation fan, a blower, a gas gathering chamber and a gas gathering pipe, the gas gathering pipe is connected to the coal gas inlet side of the high-temperature dust removal filter, a valve is provided on the gas gathering pipe, the circulation fan is communicated with the circulation pipe and is connected, through the circulation pipe, to the gas gathering chamber at one end and to the coal gas outlet side of the high-temperature dust removal filter at the other end, and a valve is provided on the circulation pipe.

17. The high-temperature dust removal and filtering system according to claim 14, wherein the preheating means and the regeneration means of the two or more sets of the high-temperature dust removal filtering apparatuses are integrated into one piece and share one set of components, the one set of shared components comprising a combustion chamber of the preheating means which is also a gas gathering chamber of the regeneration means, and a hot gas pipe of the preheating means which is also a gas gathering pipe of the regeneration means, and the one set of shared components further comprising the circulation pipe, a circulation fan and a blower.

18. A method for continuous filtration with the high-temperature dust removal and filtering system according to claim 14, wherein:
the high-temperature dust removal and filtering system consists of two high-temperature dust removal filters A and B, the preheating means for preheating the two filters and the regeneration means for regenerating the two filters, wherein each back flushing system is a pulse back flushing system, and the method for continuous dust removal and filtering includes the following steps:
(1) preheating the high-temperature dust removal filter A, then stopping preheating of the high-temperature dust removal filter A when the high-temperature dust removal filter A is preheated, switching a pipe valve to introduce an unfiltered coal gas into the high-temperature dust removal filter A;
(2) back flushing the high-temperature dust removal filter A by the pulse back flushing system of the high-temperature dust removal filter A, when the high-temperature dust removal filter A is in a filtration state;

(3) preheating the high-temperature dust removal filter B once the high-temperature dust removal filter A requires regeneration, stopping preheating the high-temperature dust removal filter B when the high-temperature dust removal filter B is preheated, switching the pipe valve to introduce the unfiltered coal gas into the high-temperature dust removal filter B, back flushing the high-temperature dust removal filter B by the pulse back flushing system of the high-temperature dust removal filter B, closing a coal gas inlet mechanism to the high-temperature dust removal filter A and closing the pulse back flushing system of the high-temperature dust removal filter A, opening a gas replacement mechanism of the high-temperature dust removal filter A to replace coal gas within the high-temperature dust removal filter A, wherein the replaced gas enters the respective coal gas outlet pipe, closing the replacement mechanism of the high-temperature dust removal filter A when the coal gas of the high-temperature dust removal filter A is replaced, closing the coal gas outlet valve of the high-temperature dust removal filter A; and (4) switching the pipe valve, when the high-temperature dust removal filter B requires regeneration and the high-temperature dust removal filter A is regenerated, to introduce the unfiltered coal gas to the high-temperature dust removal filter A, back flushing the high-temperature dust removal filter A by the pulse back flushing system of the high-temperature dust removal filter A, closing the coal gas inlet valve of the high-temperature dust removal filter B, closing the pulse back flushing system of the high-temperature dust removal filter B, opening a gas replacement mechanism of the high-temperature dust removal filter B for coal gas replacement in the high-temperature dust removal filter B, wherein a replaced coal gas enters the respective coal gas outlet pipe, closing the coal gas outlet valve of the high-temperature dust removal filter B when the coal gas of the high-temperature dust removal filter B is replaced, and repeating steps (1) to (4).

\* \* \* \* \*